Patented Sept. 17, 1935

2,014,522

UNITED STATES PATENT OFFICE 2,014,522

MANUFACTURE OF AZOXY-ARYLAMINES

Miles A. Dahlen and James I. Carr, Wilmington, Del., assignors to E. I. du Pont de Nemours & Company, Wilmington, Del., a corporation of Delaware No Drawing. Application April 10, 1934, Serial No. 719,853

7 Claims. (Cl. 260—69)

This invention relates to the manufacture of organic compounds useful in the manufacture of dyes. More particularly, it relates to an improved method for the preparation of azoxy-arylamines by the reduction of nitroarylamines of the general formula:

$$H_2N-R-NO_2$$

wherein R is an aryl radical of the benzene or naphthalene series. The products of this reduction may be represented by the general formula:

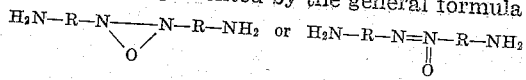

Formula I is the one generally found in patent literature; recently, however, Formula II has been proven as more probable. (Tse-Tsing Chu and Marvel, J. Am. Chem. Soc., vol. 55, pages 2841–50). It is to be understood that my invention is not conditioned upon or limited by the correctness of either formula.

The reduction of nitro-aryl compounds to the corresponding azoxy bodies has generally been effected in the art by the aid of zinc dust in the presence of strong alkali. This process is applicable to the reduction of both nitro-aryl compounds per se and nitroarylamino compounds. This process, however, suffers from the drawback that the reaction is not clear cut. In other words, the reduction does not stop at the azoxy stage, but continues further and produces in part azo and even hydrazo compounds. The product is therefore a mixture of various reduction products, from which the azoxy compound can hardly be isolated pure by any practical method.

It is also well-known that nitro compounds may be reduced to the azoxy derivatives by the action of alkali alcoholates, and particularly by sodium methylate (obtained by the addition of solid NaOH to substantially anhydrous methanol). This reducing agent does not possess the power of over-reducing the azoxy compound to azo and hydrazo derivatives. However, this method is not applicable to the reduction of nitro-aryl compounds containing free amino groups, and if applied to these compounds, produces various tarry by-products.

It is accordingly an object of this invention to provide a process for the reduction of nitroaryl-amines of the benzene or naphthalen series to the corresponding azoxy derivatives, which is characterized by the production of the desired product in good yield and high state of purity. Other and further important objects of this invention will appear as the description proceeds.

According to our invention, we employ arsenious acid or a salt thereof in alkaline medium as the reducing agent. We have found that when this reducing agent is employed, the nitro-aryl-amine is reduced successfully to the corresponding azoxy-arylamine, without the production of undesirable by-products to any appreciable extent; and the product so obtained is characterized by a high degree of purity.

The reduction is preferably effected in aqueous medium. And for best results, the other conditions of the reaction, such as temperature, agitation, concentration of reactants, etc., should be kept within certain optimum limits. These optimum limits, however, are easily determined for each individual nitro-arylamine, and there is no danger of over-reduction even if one deviates slightly from these limits.

Without limiting our invention to any particular procedure, the following example is given to illustrate our preferred mode of operation. Parts mentioned are by weight.

Example

In a suitable vessel equipped with a reflux condenser, 138 parts of meta-nitraniline, 100 parts of caustic soda and 500 parts of water are stirred together and heated to boiling. A solution of sodium arsenite, made by dissolving 185 parts of technical arsenious oxide with 125 parts of caustic soda in 600 parts of water, is added slowly over a period of about four hours, while maintaining the mass at or near the boiling point. The agitation is then continued at the same temperature for a further period of eight hours. The mass is then cooled to about 70 to 80° C.; an equal volume of water is added, and the temperature is adjusted to 60 to 65° C. The mass is then filtered, and the precipitate is washed with water until the washings are free from caustic alkalinity.

The product is 3,3'-diaminoazoxybenzene and is of good purity directly as obtained from the washed filter. If a very pure product is desired, it may be recrystallized from an organic solvent, such as alcohol or toluene. The yield is 85% of the theory or higher, based on the weight of the meta nitraniline used.

In a similar manner the azoxy derivatives from other nitroarylamines may be prepared. The following table lists a number of typical nitroarylamines which may be reduced by the same general method, together with the azoxy-arylamines obtainable from each:

| | |
|---|---|
| Ortho-nitraniline | 2,2'-diamino-azoxybenzene |
| Para-nitraniline | 4,4'-diamino-azoxybenzene |
| 4-Nitro-2-amino-toluene | 3,3'-diamino-4,4'-dimethyl-azoxybenzene |
| 5-Nitro-2-amino-toluene | 3,3'-dimethyl-4,4'-diamino-azoxybenzene |
| 3-Nitro-4-amino-toluene | 2,2'-diamino-5,5'-dimethyl-azoxybenzene |
| 4-Chloro-2-nitraniline | 2,2'-diamino-5,5'-dichloro-azoxybenzene |
| 2-Bromo-4-nitraniline | 4,4'-diamino-3,3'-dibromo-azoxybenzene |
| 4-Nitro-2-amino-anisole | 3,3'-diamino-4,4'-dimethoxy-azoxybenzene |
| 3-Nitro-4-amino-anisole | 2,2'-diamino-5,5'-dimethoxy-azoxybenzene |
| 4-Nitro-2-amino-diphenylether | 3,3'-diamino-4,4'-diphenoxy-azoxybenzene |
| 3-Nitro-4-amino-azobenzene | 2,2'-diamino-5,5'-diphenyl-azo-azoxybenzene |
| 4-Nitro-1-naphthylamine | 4,4'-diamino-azoxynaphthalene |
| 1-Nitro-2-naphthylamine | 2,2'-diamino-azoxynaphthalene |
| 3-Nitro-4-amino-diphenyl | 2,2'-diamino-5,5'-diphenyl-azoxybenzene |

As already mentioned, the particular conditions of operation may be varied in each instance within the skill of the chemist, to suit the particular properties or behaviour of the arylamine being reduced. Thus, although the reduction process may usually be carried out in aqueous solution or suspension, in the instances where the nitro-arylamine and/or the azoxy-arylamine are high in melting-point, low in solubility, etc., it may be desirable to add varying quantities of organic solvents, such as methanol, ethyl alcohol, ethylene-glycol, toluene, solvent naphtha, chlorobenzene, etc., to the reaction mass to facilitate attack of the nitro group by the reducing agent.

Instead of sodium arsenite, other arsenites, particularly that of potassium, calcium or ammonium, may be used. Arsenious acid or arsenious oxide with a solution of the corresponding metal hydroxide, may also be used.

The temperatures involved in the reaction may be varied within wide limits.

Many other variations and modifications are possible in our preferred mode of procedure without departing from the spirit of this invention.

We claim:

1. The process of producing an azoxy-arylamine of the benzene or naphthalene series, which comprises reducing the corresponding nitroarylamine by the aid of a metal arsenite in alkaline medium.

2. The process of producing an azoxy-arylamine of the benzene series, which comprises reducing the corresponding nitro-arylamine of the benzene series by the aid of an arsenite in alkaline medium.

3. The process of producing an azoxy-arylamine of the benzene series, which comprises reducing a metanitroaniline compound by the aid of an alkali-metal arsenite in aqueous alkaline medium.

4. The process of producing 3,3'-diamino-azoxybenzene, which comprises reducing meta-nitraniline by the aid of an alkali-metal arsenite in aqueous alkaline medium.

5. The process of producing 3,3'-diamino-azoxybenzene, which comprises reducing meta-nitraniline in boiling aqueous alkaline medium, by the aid of an arsenite selected from the group consisting of sodium, potassium, ammonium, and calcium arsenites.

6. The process of producing 3,3'-diamino-azoxybenzene, which comprises reacting upon substantially 138 parts of metanitraniline, suspended in substantially 500 parts of water containing 100 parts of caustic soda, at the boiling point of the mixture, with an arsenite solution obtained from substantially 185 parts of arsenious oxide, 125 parts of caustic soda and 600 parts of water.

7. The process of producing 3,3'-diamino-azoxybenzene, which comprises reacting upon substantially 138 parts of metanitraniline, suspended in substantially 500 parts of water containing 100 parts of caustic soda, at the boiling point of the mixture, with an arsenite solution obtained from substantially 185 parts of arsenious oxide, 125 parts of caustic soda and 600 parts of water, and continuing the heating for a period of substantially 8 hours.

MILES A. DAHLEN.
JAMES I. CARR.